(12) United States Patent
Huang et al.

(10) Patent No.: US 11,771,116 B2
(45) Date of Patent: Oct. 3, 2023

(54) TYPE OF POPCORN EXTRUDER

(71) Applicant: XIA MEN XIN FENG DA MACHINERY AND TECHNOLOGY LIMITED, Xiamen (CN)

(72) Inventors: Guanjie Huang, Putian (CN); Jianchun Zou, Jingdezhen (CN)

(73) Assignee: XIA MEN XIN FENG DA MACHINERY AND TECHNOLOGY LIMITED, Xiamen (CN)

( * ) Notice: Subject to any disclaimer, the term of this patent is extended or adjusted under 35 U.S.C. 154(b) by 312 days.

(21) Appl. No.: 16/765,397

(22) PCT Filed: Dec. 4, 2019

(86) PCT No.: PCT/CN2019/123041
§ 371 (c)(1),
(2) Date: May 19, 2020

(87) PCT Pub. No.: WO2020/119553
PCT Pub. Date: Jun. 18, 2020

(65) Prior Publication Data
US 2021/0289829 A1    Sep. 23, 2021

(30) Foreign Application Priority Data

Dec. 12, 2018  (CN) .......................... 201811515287.6

(51) Int. Cl.
*A23L 7/183*  (2016.01)
*A23P 30/38*  (2016.01)
*A23L 7/187*  (2016.01)

(52) U.S. Cl.
CPC .............. *A23L 7/183* (2016.08); *A23L 7/187* (2016.08); *A23P 30/38* (2016.08)

(58) Field of Classification Search
CPC ........... A23L 7/183; A23L 7/187; A23P 30/38
(Continued)

(56) References Cited

U.S. PATENT DOCUMENTS 1,713,539 A * 5/1929 Le Claire ................ A23L 7/183
222/510
3,701,667 A * 10/1972 Heki et al. .............. A23L 7/183
426/450

FOREIGN PATENT DOCUMENTS

CN         2125921 U    12/1992
CN       201752224 U     3/2011
(Continued)

OTHER PUBLICATIONS

International Search Report of PCT/CN2019/123041.
Written Opinion of PCT/CN2019/123041.

*Primary Examiner* — Reginald Alexander

(57) ABSTRACT

A popcorn extruder includes a feeder, a popping chamber, a heating device, an unloading device, and a discharge tube. The chamber is a vertical cylindrical barrel. Said heating device and said unloading device are installed on top of the barrel and at the bottom of the barrel, respectively. Said feeder has a discharge end connected with the upper-end side wall of the chamber. Said discharge tube has one end installed at the upper-end side wall of the chamber. Said unloading device has a conical structure. Said conical structure is located in the chamber, and said conical structure has the tapered end facing up. Said heating device includes a fan, an air duct and a heater installed in the air duct; said fan is connected with one end of the air duct; and said air duct has the other end inserted in the chamber and is adjacent to the conical structure.

9 Claims, 5 Drawing Sheets

(58) Field of Classification Search
USPC .......................................... 99/323.9, 323.11
See application file for complete search history.

(56) References Cited

FOREIGN PATENT DOCUMENTS

| | | | | |
|---|---|---|---|---|
| CN | 102349623 A | 2/2012 | | |
| CN | 103877733 A | 6/2014 | | |
| CN | 206150382 U | 5/2017 | | |
| CN | 109527402 A | 3/2019 | | |
| WO | WO-2004054384 A1 * | 7/2004 | ............. | A23L 1/187 |
| WO | WO2012164527 A2 * | 10/2014 | ............. | A23L 7/187 |

* cited by examiner ic # TYPE OF POPCORN EXTRUDER

CROSS-REFERENCE TO RELATED APPLICATIONS

This application is a national stage application of PCT Application No. PCT/CN2019/123041. This application claims priority from PCT Application No. PCT/CN2019/123041, filed Dec. 4, 2019, and CN Application No. 201811515287.6, filed Dec. 12, 2018, the contents of which are incorporated herein in the entirety by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

TECHNICAL FIELD

The present disclosure relates to a hot air roasting mechanism and particularly relates to a new type of popcorn extruder.

BACKGROUND

Popcorn is usually produced by hot air popping. Existing popcorn extruders produce popcorn by procedures of inhaling external air through a blast fan at the bottom, heating the air via a heater, guiding hot air into a popping tank, and heating the corns to make corns popped via the hot air flow. Besides, raw corns are slowly and manually fed, and good popcorn is discharged together with defective popcorn through a discharge outlet. Such popping approach using hot air at the bottom can meet certain production and processing demands, but it has the following defects: the imported raw materials are unevenly heated by the hot air flow at the bottom so that the corns may be not well heated and have poor taste; a large amount of air flow is needed; the blast fan and the heater consume a large amount of electricity; manual operation of material feeding is low in efficiency, high in labor intensity and cost, and tends to cause scalds and other potential safety hazards; and discharging the finished popcorn together with the defective one affects popcorn quality, customer satisfaction and eating experience.

Therefore, a heretofore unaddressed need exists in the art to address the aforementioned deficiencies and inadequacies.

BRIEF SUMMARY OF THE INVENTION

The present disclosure provides a new type of popcorn extruder to effectively solve the problems of poor popping effect and discharge of good popcorn together with defective popcorn.

The present disclosure provides a new type of popcorn extruder, including a feeder, a popping chamber, a heating device, an unloading device, and a discharge tube. The popping chamber is a vertical cylindrical barrel. The heating device is installed on top of the cylindrical barrel. The unloading device is installed at the bottom of the cylindrical barrel. The feeder has a discharge end connected with the upper-end side wall of the popping chamber. The discharge tube has one end installed at the upper-end side wall of the popping chamber. The unloading device has a conical structure on top. The conical structure is located in the popping chamber and has the tapered end facing up. The heating device comprises a fan, an air duct and a heater; the heater is installed in the air duct; the fan is connected with one end of the air duct; and the air duct has the other end which is inserted in the popping chamber and is adjacent to the conical structure on top of the unloading device.

Further, the air duct includes an upper air duct cavity, a conical air duct cavity with a cross section which reduces from the top down, a lower air duct cavity; the bottom of the upper air duct cavity is connected with the top of the conical air duct cavity; the top of the lower air duct cavity is connected with the bottom of the conical air duct cavity; the cross section area of the upper air duct cavity is greater than the cross section area of the lower; and the heater is installed in the upper air duct cavity.

Further, the heater has a heating sleeve and electric heating wires; the heating sleeve is formed with vent holes; the electric heating wires are installed in the vent holes; the heating sleeve is fixedly installed in the upper air duct cavity.

Further, the heating sleeve is formed with not less than two vent holes.

Further, the vent holes are DNA type spiral holes.

Further, the heating sleeve is a ceramic cylinder.

Further, the popping chamber is partly or completely made of high temperature resistant glass tube.

Further, the popping chamber has an inner edge structure which shrinks from the top down at the bottom so that the bottom of the popping chamber is a reversely conical cavity.

Further, the unloading device also includes a housing, a lifting motor, and a drive rod, wherein the housing is provided with a bent unloading cavity, an opening at the upper end of the unloading cavity is provided on a top surface of the housing, an opening at the lower part of the unloading cavity is formed on a side surface of the housing, the lifting motor is installed at the bottom of the housing, and the lifting motor is connected to the bottom of the conical structure via the drive rod, the bottom of the conical structure covers the upper opening of the unloading cavity, and the bottom area of the conical structure is not less than the cross section area of the upper opening of the unloading cavity.

Further, the conical head structure has a spiral screw thread structure on top.

Furthermore, the new type of popcorn extruder also includes a frame, the frame having a front discharge outlet communicating with the discharge tube; the frame is provided with a lighting LOGO plate on top, a lighting lamp and an electric control cabinet inside; the frame is laterally provided with radiating fins and four movable trundles at the bottom.

Compared with the prior art, the present disclosure has the following characteristics: the feeder and the discharge tube are connected to the top of the popping chamber, while the air outlet of the heating device is located at the bottom of the popping chamber, so hot air heats and pops the corns from the bottom; the volume of popcorn is multiplied after popping, so good popcorn can be blown upward by hot air and then discharged via the discharge tube, while the defective popcorn receives less hot air due to smaller volume and therefore stays in the popping chamber, thus realizing automatic separation between good popcorn and defective popcorn, reducing demands on manual separation, and improving the quality of the produced popcorn. At the same time, the present disclosure adopts the conical structure to distribute hot air from the air duct so that the hot air can be uniformly distributed in the popping chamber to heat corns uniformly.

BRIEF DESCRIPTIONS OF THE DRAWINGS

The accompanying drawings illustrate one or more embodiments of the present disclosure and, together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
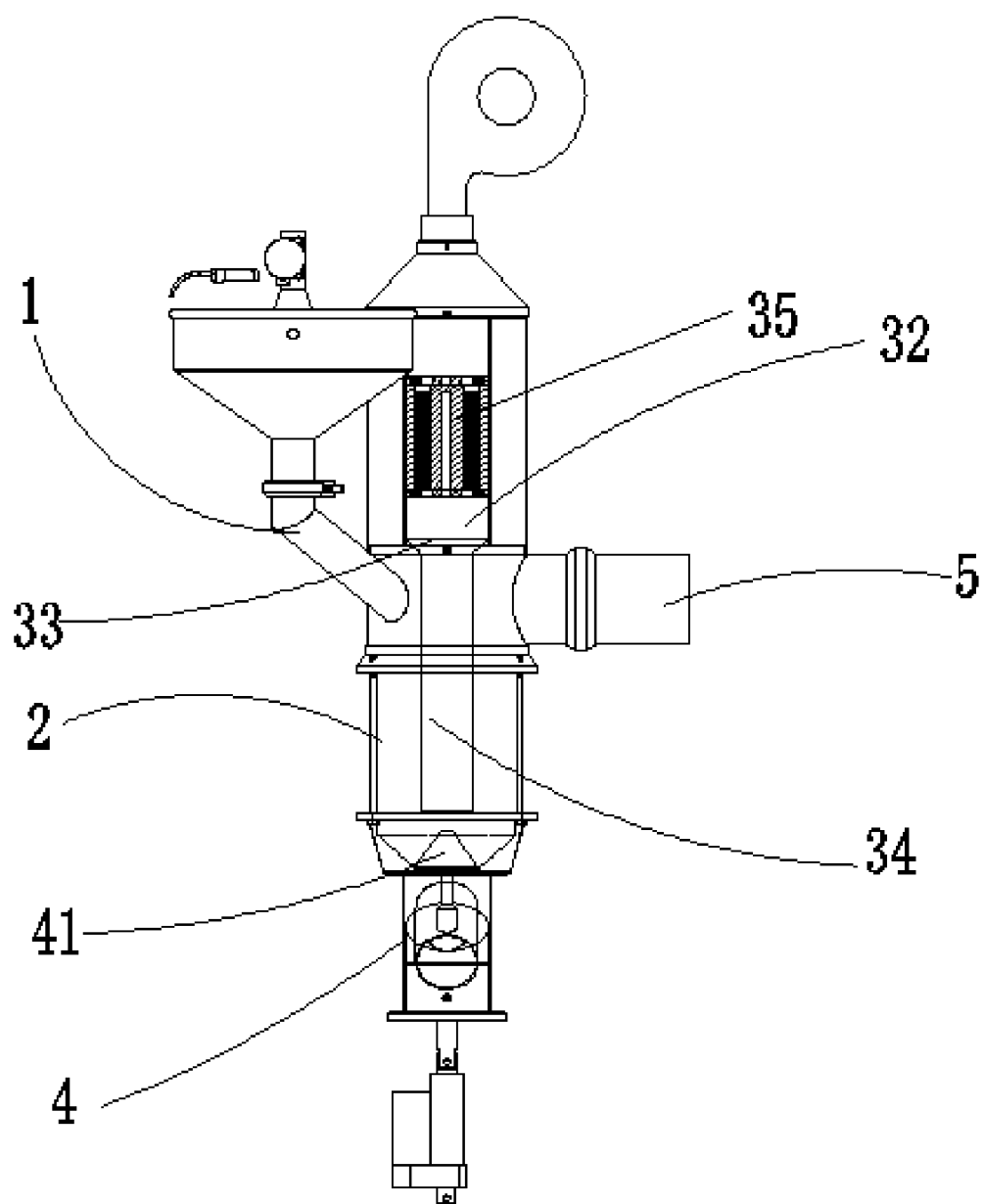
FIG. 1 is a structural view of the embodiment of the present disclosure.

The present disclosure will now be described more fully hereinafter with reference to the accompanying drawings, in which exemplary embodiments of the present disclosure are shown. The present disclosure may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

In order that those skilled in the art better understand the solution of the present disclosure, the technical solution of the embodiment of the present disclosure is clearly and completely described below in conjunction with the attached drawings of the embodiment of the present disclosure. Obviously, the described embodiment is only a part of the embodiment of the present disclosure, not all the embodiment. Based on the embodiment of the present disclosure, all other embodiment obtained by those ordinarily skilled in the art without creative labor shall all fall within the protective scope of the present disclosure.

It needs to be noted that terms such as "first" and "second" in the description, claims and above-mentioned attached drawings of the present disclosure are used for distinguishing similar objects instead of describing specific sequence or sequential order.

The embodiment of the present disclosure discloses a new type of popcorn extruder as shown in FIG. 1, including a feeder 1, a popping chamber 2, a heating device 3, an unloading device 4, and a discharge tube 5. The popping chamber 2 is a vertical cylindrical barrel. The heating device 3 is installed on top of the cylindrical barrel 2. The unloading device 4 is installed at the bottom of the cylindrical barrel 2. The feeder 1 has a discharge end connected with the upper-end side wall of the popping chamber 2. The discharge tube 5 has one end installed at the upper-end side wall of the popping chamber 2. The unloading device 4 has a conical head structure 41 on top. The conical structure 41 is located in the popping chamber 2, and the conical structure 41 has the tapered end facing up. The heating device 3 including fan 31, an air duct and a heater 35; the heater 35 is installed in the air duct; the fan 31 is connected with one end of the air duct; and the air duct has the other end which is inserted in the popping chamber 2 and is adjacent to the conical structure 41 on top of the unloading device 4.

Optionally, as shown in FIG. 1, the air duct includes an upper air duct cavity 32, a conical air duct cavity 33 with a cross section which reduces from the top down, a lower air duct cavity 34; the bottom of the upper air duct cavity 32 is connected with the top of the conical air duct cavity 33; the top of the lower air duct cavity 34 is connected with the bottom of the conical air duct cavity 33; the cross section area of the upper air duct cavity 32 is greater than the cross section area of the lower air duct cavity 34; and the heater 35 is installed in the upper air duct cavity 32.

Figure 3:
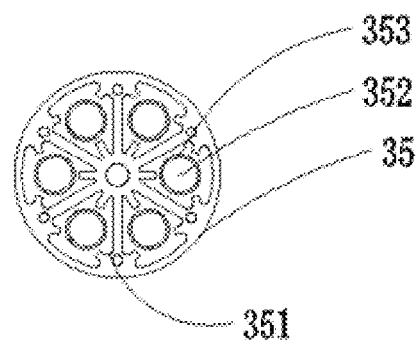
FIG. 3 is a structural view of a heater of the embodiment of the present disclosure.

Particularly, as shown in FIG. 3, the heater 35 includes a heating sleeve 351 and electric heating wires 353; the heating sleeve 351 is formed with vent holes 352; the electric heating wires 353 are installed in the vent holes 352; and the heating sleeve 353 is fixedly installed in the upper air duct cavity 32.

Particularly, the heating sleeve 351 is formed with not less than two vent holes 352.

Particularly, the heating sleeve 351 is a ceramic cylinder.

Optionally, the popping chamber is partly or completely made of high temperature resistant glass tube.

In the embodiment, as shown in FIG. 1, the heating sleeve 351 in the embodiment of the present disclosure has six vent holes 352 so that the heating sleeve 351 has a honeycomb-like cross section. The popping chamber 2 is partly made of high temperature resistant glass tube so that clients can observe the popping process of corns via the glass, making the popcorn extruder interesting and displayable.

Figure 2:
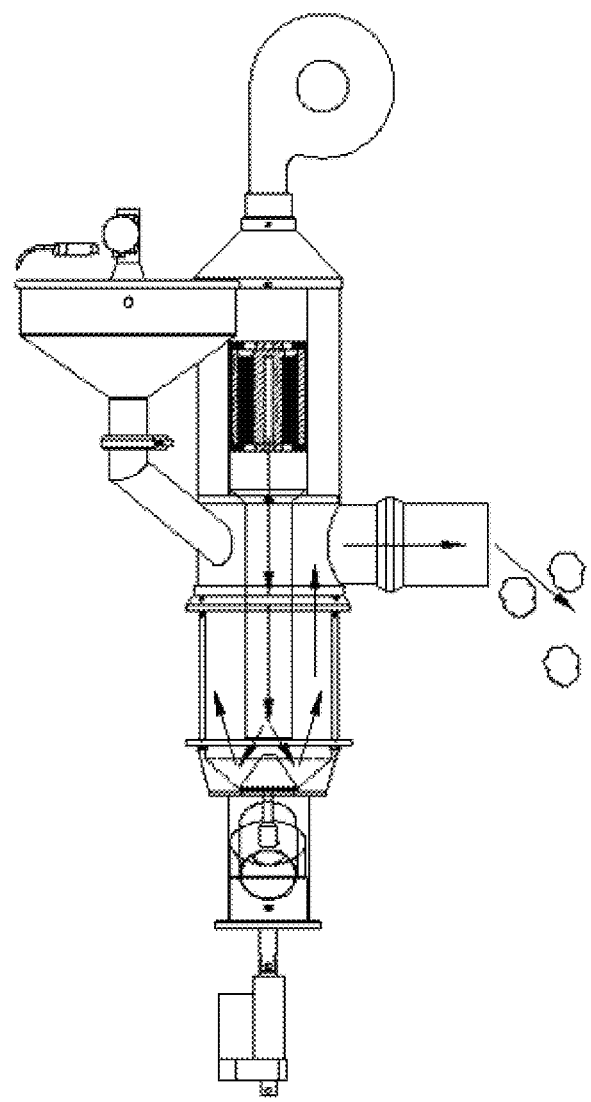
FIG. 2 is a schematic view of the hot air flow direction of the embodiment of the present disclosure.

In actual popping process, the heater 1 feeds corn kernels into the popping chamber 2; the heating device 3 blows hot air into the popping chamber 2 via the heater 35; as shown in FIG. 2, hot air distributes towards four sides by the effect of the conical structure 41 so that corn kernels in the popping chamber 2 are uniformly heated to pop into popcorns; good popcorn flies by the effect of hot air and flows out of the discharge tube 5, while the defective popcorn resides at the bottom of the popping chamber 2 due to popping failure. The unloading device 4 is started so that the defective products fall out of the popping chamber 2. Thus, the popcorn production process is completed.

The embodiment of the present disclosure features the following: the feeder and the discharge tube are connected to the top of the popping chamber, while the air outlet of the heating device is located at the bottom of the popping chamber, so the hot air heats and pops the corn kernels from the bottom. The volume of popcorn is multiplied after popping, so that good popcorn can be blown upward by hot air and then discharged via the discharge tube, while defective popcorn receives less hot air due to smaller volume and therefore stays in the popping chamber, thus realizing automatic separation between the qualified popcorn and the defective products, reducing demands on manual separation, and improving the quality of the produced popcorn. At the same time, in the embodiment of the present disclosure, the conical structure is utilized to distribute hot air coming from the air duct so that the hot air can be uniformly distributed in the popping chamber to heat corns uniformly.

Particularly, the vent holes may be DNA spiral holes so that the hot air becomes spiral by the effect of the spiral holes, ensuring that the hot air in each vent hole can be well mixed. Then, the hot air blown from the heating device is uniform, thus reducing the defective rate of corns.

Figure 4:
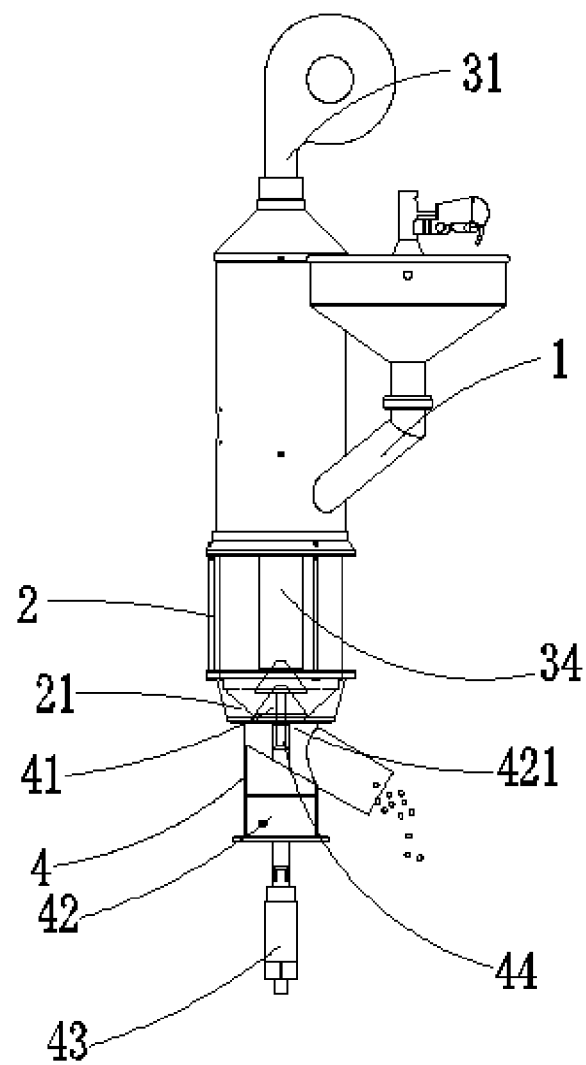
FIG. 4 is a structural view of an unloading device of the embodiment of the present disclosure.
Figure 5:
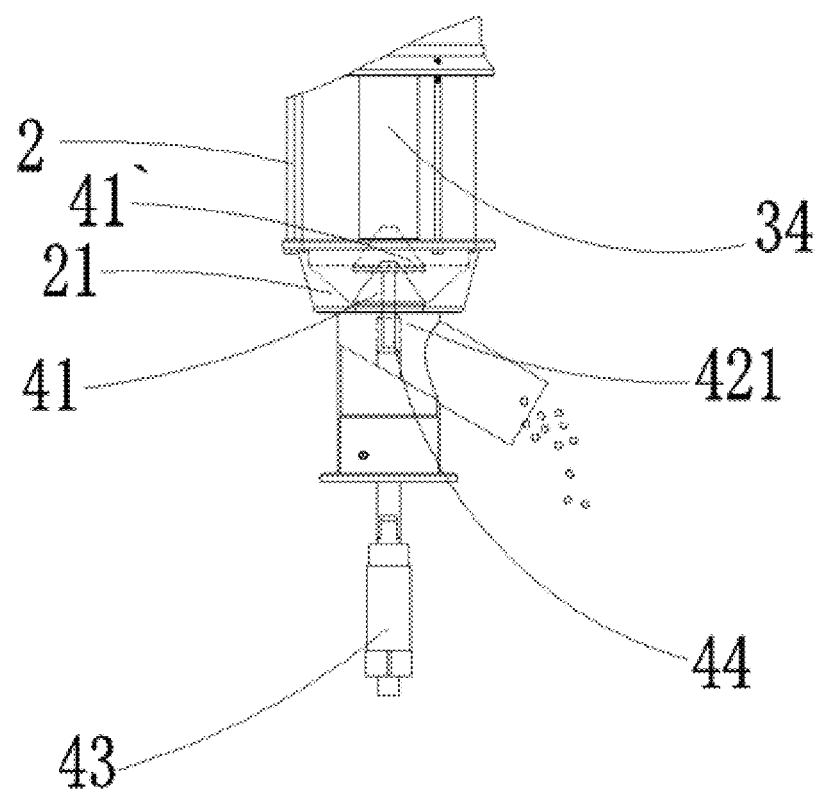
FIG. 5 is an amplified structural view of the embodiment of the present disclosure.
Figure 6:
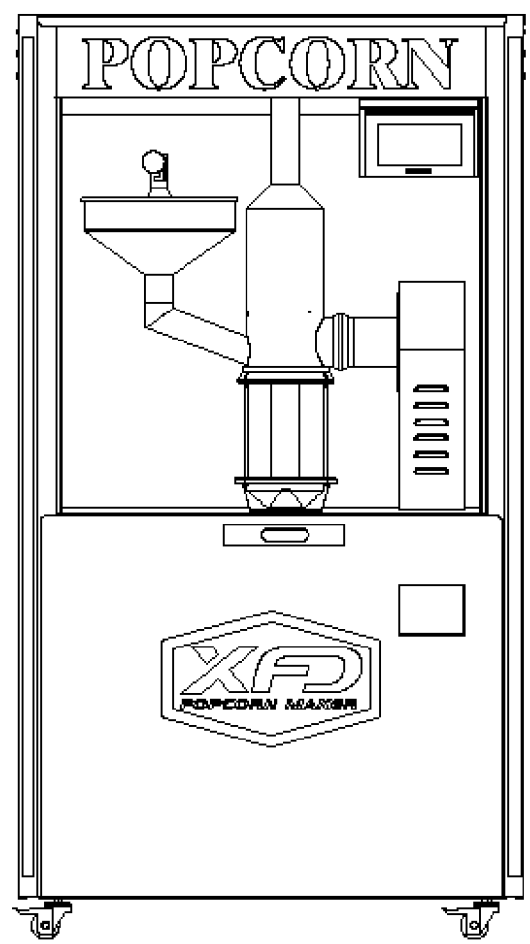
FIG. 6 is a front structural view of the present disclosure.

Optionally, as shown in FIG. 4 and FIG. 5, the popping chamber 2 has an inner edge structure 21 which shrinks from the top down at the bottom so that the bottom of the popping chamber 2 is a reversely conical cavity.

Optionally, as shown in FIG. 4 and FIG. 5, the unloading device 4 also includes a housing 42, a lifting motor 43 and a drive rod 44; the housing is provided with a bent unloading cavity 421, an opening at the upper end of the unloading cavity 421 is provided on a top surface of the housing 42; an opening at the lower end of the unloading cavity 421 is formed on a side surface of the housing 42; the lifting motor 43 is installed at the bottom of the housing 42, and the lifting motor 43 is connected with the bottom of the conical structure 41 via the drive rod 44; the bottom of the conical structure 41 covers the upper opening of the unloading cavity 421; and the bottom area of the conical structure 41 is not less than the cross section area of the upper opening of the unloading cavity 421.

In the embodiment, as shown in FIG. 4 and FIG. 5, in the non-unloading state, the conical structure 41 covers the upper opening of the unloading cavity 421, and the bottom of the popping chamber 2 is closed. In the unloading state, the lifting motor 43 pushes the drive rod 44 to force the conical structure 41 to rise to position 41', and then defective popcorn falls off from a gap between the conical structure 41 and the inner edge structure 21. The lifting motor 43 is a servo motor.

By adopting the inner edge structure 21, the embodiment of the present disclosure ensures that, on the one hand, hot air quickly deflects upwards by the effect of the inner edge structure 21 to form a rising air flow, and on the other hand, the slope of the inner edge structure 21 can promote falling of defective popcorn. At the same time, by adopting the lifting motor 43 and the drive rod 44, the embodiment of the present disclosure ensures that the conical structure 41 keeps a sufficient space where the defective products fall off away from the inner edge structure 21 after rising, and good popcorn is blocked and prevented from falling off by using the characteristic that the volume of good popcorn is greater than that of defective popcorn.

Optionally, the conical structure 41 has a spiral screw thread structure on top; the spiral screw thread structure guides hot air so that hot air blown by the heating device becomes a spiral air flow by the effect of the spiral screw thread structure to uniformly and effectively heat corns.

Optionally, the new type of popcorn extruder also includes a frame; the frame has a front discharge outlet; the discharge outlet communicates with the discharge tube for guiding and discharging good popcorn; the frame is provided with a lighting LOGO plate on top and a lighting lamp, so that the lighting lamp and LOGO plate with light beams attract tourists; the frame is provided with four movable trundles at the bottom and an electric control cabinet inside; the frame is laterally provided with radiating fins for dissipating heat generated by the inside electronic component of the electric control cabinet in time to improve the service life of electronic components.

Finally, it needs to be noted that, the above embodiment is merely used to describe the technical solution of the present disclosure instead of serving as a limit. Despite detailed description of the present disclosure with reference to the above embodiment, those ordinarily skilled in the art shall understand that those skilled can make modifications or equivalent substitutions on the embodiment of the present disclosure after reading the description of the present disclosure, but all the modifications or changes shall fall within the protective scope of the present disclosure.

The foregoing description of the exemplary embodiments of the present disclosure has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A new type of popcorn extruder, comprising:
a feeder;
a popping chamber;
a heating device;
an unloading device; and
a discharge tube, wherein
the popping chamber is a vertical cylindrical barrel;
said heating device is installed on top of the cylindrical barrel;
said unloading device is installed at the bottom of the cylindrical barrel;
said feeder has a discharge end connected with the upper-end side wall of the popping chamber;
said discharge tube has one end installed at the upper-end side wall of the popping chamber;
said unloading device has a conical structure on top;
said conical structure is located in the popping chamber;
said conical structure has the tapered end facing up;
said heating device comprises a fan, an air duct and a heater;
said heater is installed in the air duct;
said fan is connected with one end of the air duct;
said air duct has the other end which is inserted in the popping chamber and is adjacent to the conical structure on top of the unloading device;
said unloading device also comprises a housing, a lifting motor, and a drive rod;
said housing is provided with a bent unloading cavity, an opening at the upper end of said unloading cavity is provided on a top surface of the housing;
an opening at the lower part of said unloading cavity is formed on a side surface of the housing;
said lifting motor is installed at the bottom of the housing, and said lifting motor is connected to the bottom of the conical structure via the drive rod;
the bottom of said conical structure covers the upper opening of the unloading cavity; and
the bottom area of said conical structure is not less than the cross section area of the upper opening of the unloading cavity.

2. The new type of popcorn extruder of claim 1, wherein said air duct comprises an upper air duct cavity, a conical air duct cavity with a cross section which reduces from the top down, a lower air duct cavity; the bottom of said upper air duct cavity is connected with the top of the conical air duct cavity; the top of said lower air duct cavity is connected with the bottom of the conical air duct cavity; the cross section area of said upper air duct cavity is greater than the cross section area of said lower air duct cavity; and said heater is installed in the upper air duct cavity.

3. The new type of popcorn extruder of claim 2, wherein said heater comprises a heating sleeve and electric heating wires; said heating sleeve is formed with vent holes; said electric heating wires are installed in the vent holes; said heating sleeve is fixedly installed in the upper air duct cavity; and said heating sleeve is a ceramic cylinder.

4. The new type of popcorn extruder of claim 3, wherein said heating sleeve has not less than two vent holes.

5. The new type of popcorn extruder of claim 4, wherein said vent holes are DNA type spiral holes.

6. The new type of popcorn extruder of claim 1, wherein said popping chamber is partly or completely made of high temperature resistant glass tube.

7. The new type of popcorn extruder of claim 1, wherein said popping chamber has an inner edge structure which shrinks from the top down at the bottom so that the bottom of the popping chamber is a reversely conical cavity.

8. The new type of popcorn extruder of claim 1, wherein said conical head structure has a spiral screw thread structure on top.

9. The new type of popcorn extruder according to claim 1, wherein said new type of popcorn extruder also comprises a frame, said frame having a front discharge outlet, the discharge outlet communicating with the discharge tube; said frame is provided with a lighting LOGO plate on top; said frame is internally provided with a lighting lamp; said frame is provided with an electric control cabinet inside; said frame is laterally provided with radiating fins; and said frame is provided with four movable trundles at the bottom.

* * * * *